UNITED STATES PATENT OFFICE.

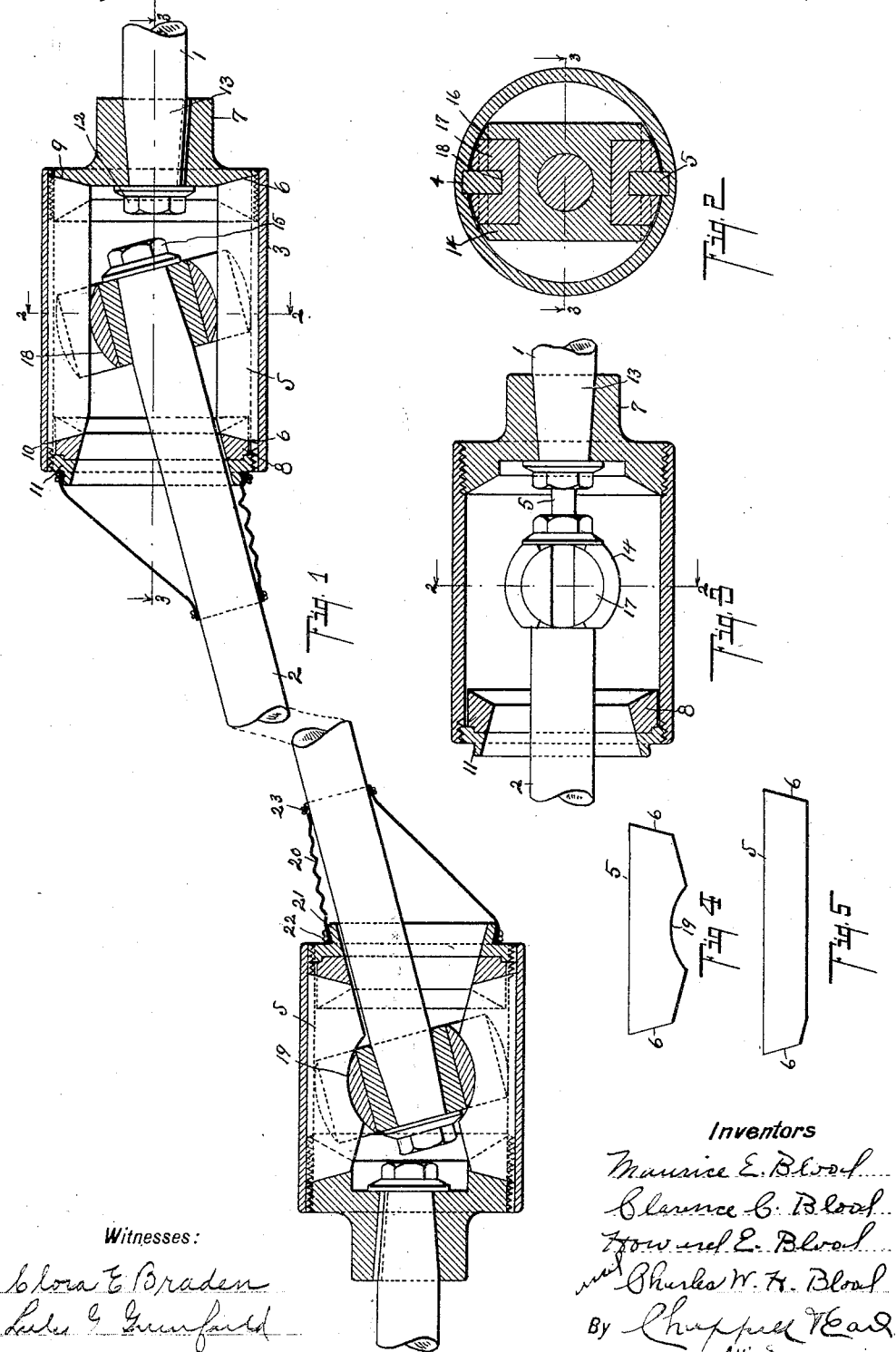

MAURICE E. BLOOD, CLARENCE C. BLOOD, AND HOWARD E. BLOOD, OF KALAMAZOO, MICHIGAN, AND CHARLES W. H. BLOOD, OF WINTHROP, MASSACHUSETTS, ASSIGNORS TO BLOOD BROTHERS MACHINE COMPANY, OF KALAMAZOO, MICHIGAN.

UNIVERSAL JOINT.

No. 902,550.  Specification of Letters Patent.  Patented Nov. 3, 1908.

Application filed July 10, 1908. Serial No. 443,002.

*To all whom it may concern:*

Be it known that we, MAURICE E. BLOOD, CLARENCE C. BLOOD, and HOWARD E. BLOOD, citizens of the United States, residing at the city of Kalamazoo, county of Kalamazoo, and State of Michigan; and CHARLES W. H. BLOOD, a citizen of the United States, residing at the city of Winthrop, county of Suffolk, State of Massachusetts, have invented certain new and useful Improvements in Universal Joints, of which the following is a specification.

This invention relates to improvements in universal joints.

The main objects of this invention are: first, to provide an improved combination universal and slip joint; second, to provide an improved universal joint in which the parts are simple in structure and easily assembled, and one which can be readily disassembled and reassembled, should occasion require for the renewal of any of the wearing parts; third, to provide an improved joint which is very durable in use and comparatively economical to produce.

Further objects, and objects relating to structural details, will definitely appear from the detailed description to follow.

We accomplish the objects of our invention by the devices and means described in the following specification The invention is clearly defined and pointed out in the claims.

A structure embodying the features of our invention is clearly illustrated in the accompanying drawing, forming a part of this specification, in which:

Figure 1 is a longitudinal section of a structure embodying the features of our invention, the shafts being shown in detail and in full lines. Fig. 2 is a cross section, taken on a line corresponding to line 2—2 of Figs. 1 and 2. Fig. 3 is a detail longitudinal section, taken on a line corresponding to line 3—3 of Figs. 1 and 2. Figs. 4 and 5 are side elevations of the spline-like bearings for the right and left-hand socket members of Fig. 1.

In the drawings, similar reference characters refer to similar parts throughout the several views, and the sectional views are taken looking in the direction of the little arrows at the ends of the section line.

Referring to the drawing, 1—1 represents the shafts to be coupled and 2 represents the coupling shaft. Our improved coupling preferably comprises a pair of socket members, each consisting of a cylindrical shell 3 having internal longitudinal grooves 4 therein to receive the spline-like bearings 5. These bearings are beveled at each end, as at 6. The bearings 5 are secured in place in the shell preferably by means of the end piece 7 and the clamping ring 8, the end piece and clamping ring being provided with seats 9 and 10, respectively, which receive the ends of the bearings, clamping them in the grooves of the shell, the seats being tapered so that, as the clamping ring is forced upon the ends of the bearings—as by means of the clamping nut 11, which is threaded into the end of the shell—the bearings are clamped firmly in their seats.

The end pieces 7 are adapted to receive the ends of the shafts 1 to be coupled, which are secured by means of the nuts 12, and the keys 13 so that the shells are revolved with the shafts.

The coacting coupling members each preferably consist of the head 14 which is secured upon the end of the coupling shaft 2, as by means of the nut 15. The head 14 is provided with cylindrical bearing seats 16, in which the forked bearing blocks 17 are arranged. These bearing blocks are forked to engage the spline-like bearings 4 of the socket coupling member and are curved at 18 to engage and bear upon the edges of the bearings 5, so that the member may be rocked within the socket member in any direction. We preferably provide one of the couplings with curved seats 19 in its bearings 5 to receive the bearing blocks so that longitudinal movement of the coupling members, relative to each other, is prevented, thereby securing in effect a ball-and-socket joint.

We preferably close the inner end of the socket member by means of the flexible casing 20, the inner end of which is secured on a flange 21 on the clamping nuts 11 by means of the wire 22, while the outer end is secured to the coupling shaft 2 by means of a wire, as 23, the object being to exclude dust and dirt and to assist in retaining the lubricant.

By thus forming and arranging the parts, we secure a combination universal and slip joint in which the parts are economical to manufacture and very easily and quickly assembled and, should occasion require, the structure can be readily disassembled and reassembled for the renewal of any part. As will appear from the drawing and description thereof, the parts are secured in place without resort to rivets or screws, or the like. In assembling, the end piece 7 is first adjusted in the shell, the bearings 5 inserted in their seats, the bearing blocks 17 inserted in the head 14 and slipped into place in the socket member, the head having, of course, been secured to the coupling shaft, and the clamping ring inserted and secured by means of the clamping nut 11, which secures all of the parts in position, and, when removed, releases them so that they can be entirely disassembled. In assembling, the members of the coupling shown on the left of Fig. 1, the bearings 5 and the head are slipped into the shell after being brought into proper relation to each other.

We have illustrated and described our improved coupling in detail in the form preferred by us on account of the structural simplicity and economy and the convenience with which the parts may be assembled or disassembled. We are, however, aware that our improvements are capable of considerable variation in structural details without departing from our invention, and we desire to claim the same specifically, as illustrated, as well as broadly.

Having thus described our invention, what we claim as new and desire to secure by Letters Patent is:

1. The combination with a coupling shaft, of a pair of socket coupling members, each comprising a shell having internal longitudinal groove-like seats therein, a pair of spline-like bearings having beveled ends arranged in said seats, an end piece adapted to be secured to a shaft to be coupled, threaded into the outer ends of said shell, said end piece having seats in its inner face in which the ends of said bearings are arranged, a clamping ring having seats therein adapted to receive the outer ends of said bearings, and a clamping nut for said ring threaded into the inner end of said shell; and a pair of coacting coupling members, each comprising a head secured upon the end of said coupling shaft, said head having cylindrical bearing seats therein, and forked bearing blocks arranged in said seats to engage said socket bearing members, said bearing blocks being curved to bear on the edges of said socket bearing members, the bearings of one of said socket members having curved seats in their edges for the coacting bearing blocks, whereby longitudinal movement of the parts relative to each other is prevented.

2. The combination with a coupling shaft, of a pair of socket coupling members, each comprising a shell having internal longitudinal groove-like seats therein, a pair of spline-like bearings having beveled ends arranged in said seats, an end piece adapted to be secured to a shaft to be coupled, threaded into the outer ends of said shell, said end piece having seats in its inner face in which the ends of said bearings are arranged, a clamping ring having seats therein adapted to receive the outer ends of said bearings, and a clamping nut for said ring threaded into the inner end of said shell; and a pair of coacting coupling members, each comprising a head secured upon the end of said coupling shaft, said head having cylindrical bearing seats therein, and forked bearing blocks arranged in said seats to engage said socket bearing members, said bearing blocks being curved to bear on the edges of said socket bearing members.

3. The combination with a coupling shaft, of a pair of socket coupling members, each comprising a shell having internal longitudinal groove-like seats therein, a pair of spline-like bearings having beveled ends arranged in said seats, an end piece adapted to be secured to a shaft to be coupled, arranged in the outer end of said shell, said end piece having seats in its inner face in which the ends of said bearings are arranged, a clamping ring having seats therein adapted to receive the outer ends of said bearings; and a pair of coacting coupling members, each comprising a head secured upon the end of said coupling shaft, said head having cylindrical bearing seats therein, and forked bearing blocks arranged in said seats to engage said socket bearing members, said bearing blocks being curved to bear on the edges of said socket bearing members, the bearings of one of said socket members having curved seats in their edges for the coacting bearing blocks, whereby longitudinal movement of the parts relative to each other is prevented.

4. The combination with a coupling shaft, of a pair of socket coupling members, each comprising a shell having internal longitudinal groove-like seats therein, a pair of spline-like bearings having beveled ends arranged in said seats, an end piece adapted to be secured to a shaft to be coupled, arranged in the outer ends of said shell, said end piece having seats in its inner face in which the ends of said bearings are arranged, a clamping ring having seats therein adapted to receive the outer ends of said bearings; and a pair of coacting coupling members, each comprising a head secured upon the end of said coupling shaft, said head having cylindrical bearing seats therein, and forked bearing blocks arranged in said seats to engage said socket bearing members, said bearing blocks being curved to bear on the edges of said socket bearing members.

5. The combination of a socket coupling member, comprising a shell having internal longitudinal groove-like seats therein, a pair of spline-like bearings having beveled ends arranged in said seats, an end piece adapted to be secured to a shaft to be coupled, threaded into the outer ends of said shell, said end piece having seats in its inner face in which the ends of said bearings are arranged, a clamping ring having seats therein adapted to receive the outer ends of said bearings, and a clamping nut for said ring threaded into the inner end of said shell; and a coacting coupling member, comprising a head adapted to be secured upon the end of a shaft, said head having cylindrical bearing seats therein, and forked bearing blocks arranged in said seats to engage said socket bearing members, said bearing blocks being curved to bear on the edges of said socket bearing members.

6. The combination of a socket coupling member, comprising a shell having internal longitudinal groove-like seats therein, a pair of spline-like bearings having beveled ends arranged in said seats, an end piece adapted to be secured to a shaft to be coupled, arranged in the outer ends of said shell, said end piece having seats in its inner face in which the ends of said bearings are arranged, a clamping ring having seats therein adapted to receive the outer ends of said bearings; and a coacting coupling member comprising a head adapted to be secured upon the end of a shaft, said head having cylindrical bearing seats therein, and forked bearing blocks arranged in said seats to engage said socket bearing members, said bearing blocks being curved to bear on the edges of said socket bearing members.

7. The combination of a socket coupling member, comprising a shell having internal longitudinal groove-like seats therein, a pair of spline-like bearings having beveled ends arranged in said seats, an end piece adapted to be secured to a shaft to be coupled, threaded into the outer ends of said shell, said end piece having seats in its inner face in which the ends of said bearings are arranged, a clamping ring having seats therein adapted to receive the outer ends of said bearings, and a clamping nut for said ring threaded into the inner end of said shell; and a coacting coupling member, comprising a head adapted to be secured upon the end of a shaft, said head having cylindrical bearing seats therein, and forked bearing blocks arranged in said seats to engage said socket bearing members, said bearing blocks being curved to bear on the edges of said socket bearing members, the said socket bearing members having curved bearing seats for said bearing blocks in their edges.

8. The combination with a socket coupling member, comprising a shell having internal longitudinal groove-like seats therein, a pair of spline-like bearings having beveled ends arranged in said seats, an end piece adapted to be secured to a shaft to be coupled, arranged in the outer ends of said shell, said end piece having seats in its inner face in which the ends of said bearings are arranged, a clamping ring having seats therein adapted to receive the outer ends of said bearings; and a coacting coupling member, comprising a head adapted to be secured upon the end of a shaft, said head having cylindrical bearing seats therein, and forked bearing blocks arranged in said seats to engage said socket bearing members, said bearing blocks being curved to bear on the edges of said socket bearing members, the said socket bearing members having curved bearing seats for said bearing blocks in their edges.

9. The combination with a coupling shaft, of a pair of socket coupling members, each comprising a shell having internal longitudinal groove-like seats therein, and a pair of spline-like bearings secured in said seats; and a pair of coacting coupling members, each comprising a head secured upon the end of said coupling shaft, said head having cylindrical bearing seats therein and forked bearing blocks arranged in said seats to engage said socket bearing members, said bearing blocks being curved longitudinally to bear on the edges of said socket bearing members, the bearings of one of said socket members having curved seats in their edges for the coacting bearing blocks, whereby longitudinal movement of the parts relative to each other is prevented.

10. The combination with a coupling shaft, of a pair of socket coupling members, each comprising a shell having internal longitudinal groove-like seats therein, and a pair of spline-like bearings secured in said seats; and a pair of coacting coupling members, each comprising a head secured upon the end of said coupling shaft, said head having cylindrical bearing seats therein, and forked bearing blocks arranged in said seats to engage said socket bearing members, said bearing blocks being curved longitudinally to bear on the edges of said socket bearing members.

11. The combination with a coupling shaft, of a pair of socket coupling members, each comprising a shell, and a pair of spline-like bearings arranged in said shell; and a pair of coacting coupling members, each comprising a head secured upon the end of said coupling shaft, said head having cylindrical bearing seats therein and forked bearing blocks arranged in said seats to engage said socket bearing members, said bearing blocks being curved longitudinally to bear on the edges of said socket bearing members, the bearings of one of said socket members having curved seats in their edges for the coacting bearing blocks, whereby longitudinal movement of the parts relative to each other is prevented.

12. The combination with a coupling shaft, of a pair of socket coupling members, each comprising a shell, and a pair of spline-like bearings arranged in said shell; and a pair of coacting coupling members, each comprising a head secured upon the end of said coupling shaft, said head having cylindrical bearing seats therein and forked bearing blocks arranged in said seats to engage said socket bearing members, said bearing blocks being curved longitudinally to bear on the edges of said socket bearing members.

13. The combination of a socket coupling member, comprising a shell having internal longitudinal groove-like seats therein, and a pair of spline-like bearings secured in said seats; and a coacting coupling member, comprising a head adapted to be secured upon the end of a shaft, said head having cylindrical bearing seats therein, and forked bearing blocks arranged in said seats to engage said socket bearing members, said bearing blocks being curved longitudinally to bear on the edges of said socket bearing members, the bearings of one of said socket members having curved seats in their edges for the coacting bearing blocks, whereby longitudinal movement of the parts relative to each other is prevented.

14. The combination of a socket coupling member, comprising a shell having internal longitudinal groove-like seats therein, and a pair of spline-like bearings secured in said seats; and a coacting coupling member, comprising a head adapted to be secured upon the end of a shaft, said head having cylindrical bearing seats therein, and forked bearing blocks arranged in said seats to engage said socket bearing members, said bearing blocks being curved longitudinally to bear on the edges of said socket bearing members.

15. The combination of a socket coupling member, comprising a shell, and a pair of spline-like bearings arranged in said shell; and a coacting coupling member, comprising a head adapted to be secured upon the end of a shaft, said head having cylindrical bearing seats therein, and forked bearing blocks arranged in said seats to engage said socket bearing members, said bearing blocks being curved longitudinally to bear on the edges of said socket bearing members, the bearings of one of said socket members having curved seats in their edges for the coacting bearing blocks, whereby longitudinal movement of the parts relative to each other is prevented.

16. The combination of a socket coupling member, comprising a shell, and a pair of spline-like bearings arranged in said shell; and a coacting coupling member, comprising a head adapted to be secured upon the end of a shaft, said head having cylindrical bearing seats therein, and forked bearing blocks arranged in said seats to engage said socket bearing members, said bearing blocks being curved longitudinally to bear on the edges of said socket bearing member.

17. The combination of a socket coupling member comprising a shell having internal longitudinal groove-like seats therein, a pair of spline-like bearing members having beveled ends arranged in said seats, an end piece adapted to be secured to a shaft, threaded into the outer end of said shell, said end piece having seats in its inner face in which the ends of said bearings are arranged, a clamping ring having a seat therein adapted to receive the ends of said bearings, and a clamping nut for said ring threaded into the inner end of said shell; and a coacting coupling member comprising revolubly-supported forked bearings having curved bearing portions to bear on the edges of said bearings of said socket members, the edges of said socket member bearings having curved seats therein to receive said forked bearing members, for the purpose specified.

18. The combination of a socket coupling member comprising a shell having internal longitudinal groove-like seats therein, a pair of spline-like bearing members having beveled ends arranged in said seats, an end piece adapted to be secured to a shaft threaded into the outer end of said shell, said end piece having seats in its inner face in which the ends of said bearings are arranged, a clamping ring having a seat therein adapted to receive the ends of said bearings, and a clamping nut for said ring threaded into the inner end of said shell; and a coacting coupling member comprising revolubly-supported forked bearings having curved bearing portions to bear on the edges of said socket member, for the purpose specified.

19. The combination of a socket coupling member comprising a shell having internal longitudinal groove-like seats therein, a pair of spline-like bearing members having beveled ends arranged in said seats, an end piece adapted to be secured to a shaft arranged in the outer end of said shell, said end piece having seats in its inner face in which the ends of said bearings are arranged, a clamping ring having a seat therein adapted to receive the ends of said bearings; and a coacting coupling member comprising revolubly-supported forked bearings having curved bearing portions to bear on the edges of said bearings of said socket members, the edges of said socket member bearings having curved seats therein to receive said forked bearing members, for the purpose specified.

20. The combination of a socket coupling member comprising a shell having internal longitudinal groove-like seats therein, a pair of spline-like bearing members having beveled ends arranged in said seats, an end piece adapted to be secured to a shaft, arranged in the outer end of said shell, said end piece having seats in its inner face in which the ends of said bearings are arranged, a clamping ring having a seat therein adapted to receive the ends of said bearings, and a clamping nut for said ring threaded into the inner end of said shell; and a coacting coupling member comprising revolubly-supported forked bearings having curved bearing portions to bear on the edges of said bearings of said socket member.

21. The combination of a socket coupling member comprising a shell having internal longitudinal groove-like seats therein, a pair of spline-like bearing members having beveled ends secured in said seats; and a coacting coupling member comprising revolubly-supported forked bearings having curved bearing portions to bear on the edges of said bearings of said socket members, the edges of said socket member bearings having curved seats therein to receive said forked bearing members, for the purpose specified.

22. The combination of a socket coupling member comprising a shell having internal longitudinal groove-like seats therein; a pair of spline-like bearing members having beveled ends secured in said seats; and a coacting coupling member comprising revolubly-supported forked bearings having curved bearing portions to bear on the edges of said bearings of said socket members, for the purpose specified.

23. The combination of a socket coupling member comprising a shell, a pair of spline-like bearing members arranged in said shell; and a coacting coupling member comprising revolubly-supported forked bearings having curved bearing portions to bear on the edges of said bearings of said socket members, the edges of said socket member bearings having curved seats therein to receive said forked bearing members, for the purpose specified.

24. The combination of a socket coupling member comprising a shell, a pair of spline-like bearing members arranged in said shell; and a coacting coupling member comprising revolubly-supported forked bearings having curved bearing portions to bear on the edges of said bearings of said socket members, for the purpose specified.

In witness whereof, we have hereunto set our hands and seals in the presence of two witnesses.

MAURICE E. BLOOD. [L. S.]
CLARENCE C. BLOOD. [L. S.]
HOWARD E. BLOOD. [L. S.]
CHARLES W. H. BLOOD. [L. S.]

Witnesses to the signatures of Maurice E. Blood and Clarence C. Blood:
GERTRUDE TALLMAN,
OTIS A. EARL.

Witnesses to the signature of Howard E. Blood:
GEORGE P. ANDERSON,
V. E. VAN AMERINGEN.

Witnesses to the signature of Charles W. H. Blood:
CARL G. OSTEMAN,
S. H. VOSSMER.